United States Patent [19]

Asano et al.

[11] Patent Number: 4,748,823
[45] Date of Patent: Jun. 7, 1988

[54] AUTOMOTIVE REFRIGERATOR

[75] Inventors: Hideo Asano, Gifu; Kazuhisa Makida, Kariya; Kenichi Fujiwara, Kariya; Katsumi Hatanaka, Kariya, all of Japan

[73] Assignee: Nippondenso Co., Ltd., Kariya, Japan

[21] Appl. No.: 804,930

[22] Filed: Dec. 5, 1985

[30] Foreign Application Priority Data

Dec. 7, 1984 [JP] Japan ................... 59-25615
Jul., 1985 [JP] Japan ................... 60-156370

[51] Int. Cl.⁴ ............................................ F25D 11/02
[52] U.S. Cl. ........................................ 62/239; 62/432; 62/438; 62/524; 62/530
[58] Field of Search ............... 62/438, 524, 244, 239, 62/323.1, 199, 200, 432, 530

[56] References Cited

U.S. PATENT DOCUMENTS

| | | | |
|---|---|---|---|
| 2,428,312 | 9/1947 | Herbener | 62/432 |
| 2,706,894 | 4/1955 | Shoemaker | 62/524 X |
| 4,103,510 | 8/1978 | Hall | 62/438 X |
| 4,313,424 | 2/1982 | Schruper et al. | 126/435 X |
| 4,459,821 | 7/1984 | Cabell et al. | 62/438 X |
| 4,483,151 | 11/1984 | Fujioka et al. | 62/244 X |
| 4,543,798 | 10/1985 | Page | 62/239 |
| 4,565,072 | 1/1986 | Fujiwara et al. | 62/200 X |
| 4,637,222 | 1/1987 | Fujiwara et al. | 62/244 |

*Primary Examiner*—William E. Tapolcai
*Attorney, Agent, or Firm*—Cushman, Darby & Cushman

[57] ABSTRACT

A freezer-refrigerator for automotive vehicles, which includes a freezing chamber and a refrigeration chamber. The freezing chamber includes a freezing evaporator and a first cold storage member. The refrigeration chamber includes a refrigeration evaporator and a second cold storage member. Both evaporators are connected in series so that refrigerant flows from a compressor through the freezing evaporator and then through the refrigeration evaporator under a control of a solenoid valve which is controlled by signal from a temperature sensor provided in at least one of the chambers, thus controlling the freezing and refrigeration. The freezing temperature of the second cold storage member is set higher than that of the first cold storage member thereby to maintain the interior of the chambers at a temperature near the freezing temperature of the cold storage members for long time even after the compressor stops. The compressor has a plurality of cylinders with respective pistons at least one of which is operated for the freezing and refrigeration and the other of which are operated for the vehicle airconditioning.

9 Claims, 12 Drawing Sheets

| MODE | FREEZING TEMPERATURE SENSOR 9 | REFRIGERATION TEMPERATURE SENSOR 7 | SOLENOID VALVE 48 | INDICATOR 8 |
|---|---|---|---|---|
| 1 | Hi | Hi | CLOSED | OFF |
| 2 | Lo | Hi | CLOSED | OFF |
| 3 | Lo | Lo | OPEN | ON |
| 4 | Hi | Lo | CLOSED | OFF |
| 0 | FREEZER-REFRIGERATOR OFF, ONLY A/C ON | | OPEN | OFF |

AUTOMOTIVE REFRIGERATOR

BACKGROUND OF THE INVENTION

1. Field of the Invention

The present invention relates to refrigerators of the cold-storage type suitable for automotive vehicles such as wagons primarily used for leisure.

2. Description of the Prior Art

A conventional refrigerator of cold-storage type for automotive vehicles is disclosed in Japanese Patent Laid-Open No. 50828/84, in which a cold storage material (such as water) in the cold storage unit is cooled and frozen by an evaporator branching from the refrigeration cycle of the automotive air-conditioning system, so that the interior of the refrigerator is maintained at a low temperature over a long time even during the parking by this frozen cold storage material.

In this conventional refrigerator, the arrangement of the cold-storage material and the evaporator of the freezing cycle in the cold storage unit makes it difficult to secure the sealing characteristic of the cold storage material, resulting in a high production cost of the cold storage unit.

Another disadvantage of this conventional refrigerator is that the two different functions of freezing and refrigeration involving different cooling temperatures (such as $-10°$ C. and $0°$ C.) cannot be obtained since a single cold-storage unit is used.

SUMMARY OF THE INVENTION

The object of the present invention is to provide a freezer-refrigerator for automobiles which has the functions of both freezing and refrigeration with a very simple configuration.

According to the present invention, there is provided an automotive freezer-refrigerator comprising a freezing chamber with a freely-openable door, a refrigeration chamber with a freely-openable door, a freezing cold-storage member arranged in the freezing chamber and hermetically containing a cold storage material in a bag, a freezing evaporator arranged in close contact with the freezing cold storage member in the freezing chamber, a refrigeration cold-storage member arranged in the refrigeration chamber and containing in a bag a cold storage material higher in freezing temperature than the cold storage material of the freezing cold storage member and a refrigeration evaporator arranged in close contact with the frefrigeration cold storage member in the refrigeration chamber, wherein the freezing temperature of the cold storage material for the refrigeration cold storage member is set at a temperature (such as $0°$ C.) higher than that for the freezing cold storage member (such as $-11°$ C.), and therefore, even if the compressor of freezing cycle is stopped after complete freezing of the cold storage members, the interior of both the freezing and refrigeration chambers can be maintained at a low temperature near the freezing temperature over a long time, thus performing superior freezing and refrigeration functions with the cold storage members.

Another object of the present invention is to provide a control circuit for an automotive freezer-refrigerator comprising a freezing chamber and a refrigeration chamber each with a cold storage member and an evaporator respectively, valve means for controlling the flow of the refrigerant passing serially through the freezing evaporator and the refrigeration evaporator, and temperature sensors for detecting the temperature of the freezing chamber and the refrigeration chamber, the operation of the valve means being controlled by a signal produced from the temperature sensors. The control circuit determines the degree of freezing of the cold storage members of the two chambers on the basis of the signals from the temperature sensors for the freezing and refrigeration chambers respectively to control the operation of the valve means.

Even if the compressor stops after complete freezing of the cold storage members of the freezing and refrigeration chambers, the interiors of the freezing and refrigeration chambers are kept at low temperature near the freezing temperature thereof over a long period of time.

DESCRIPTION OF THE PREFERRED EMBODIMENTS

Figure 1:
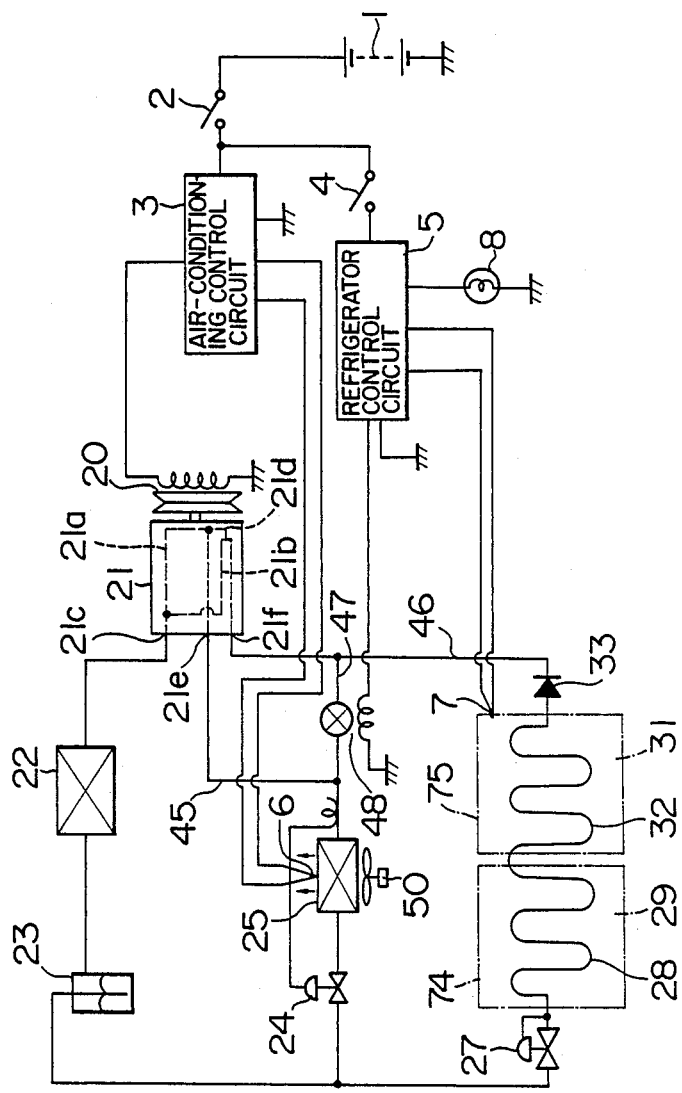
FIG. 1 is a diagram showing a freezing cycle including an electrical circuit according to one embodiment of the present invention.

A freezing cycle for an automobile for freezing or refrigerating an article as well as the air-conditioning of the interior of the automobile is shown in FIG. 1. A compressor 21 is coupled to a drive shaft of an automotive engine not shown through a magnetic clutch 20. This compressor 21 is of swash plate with ten cylinders, of which nine cylinders make up a compressor unit 21a for air-conditioning, and the remaining one cylinder a compressor unit 21b for refrigeration-freezing. The compressor units 21a and 21b of the compressor 21 have an inlet 21e for air-conditioning and an inlet 21f for freezing-refrigeration independently of each other, so that each compressor unit may set an intake pressure independently. The air-conditioning compressor unit 21a communicates with the refrigeration-freezing compressor unit 21b by way of a communication path 21d. A refrigerant R12 introduced by way of inlets 21e and 21f under different pressure communicate with each other through the path 21d before being compressed by the compressor units 21a, 21b. The refrigerant, thus having been increased in pressure up to that of the air-conditioning refrigerant, is compressed at the compressor units 21a and 21b and discharged out of the compressor from a common outlet 21c.

A specific configuration of the compressor 21 will be explained below with reference to FIGS. 2 and 3. The compressor 21 according to the present invention is of swash plate type in which the turning effort of a shaft 210 driven by an automotive engine through a magnetic clutch 20 is converted into a reciprocal motion of the piston 212 by a swash plate 211. The swash plate 211, which is keyed to the shaft 210, is rotated integrally therewith. The turning effort of the swash plate 211 is transmitted through a shoe 213 and a ball 214 to the piston 212. There are five such pistons 212, the surface of which is coated with a resin material such as teflon. These pistons 212 are arranged movably and reciprocally along the axis in five cylinder bores (one of which is shown as 216 in FIG. 1) formed in the cylinder block 215. The ends of the pistons 212 cooperate with the cylinder bores 216 to form ten cylinders 217, 217a. Of these ten cylinders, one cylinder 217a forms the freezing-refrigeration compressor unit 21b in FIG. 1, and the remaining cylinders 217 the air-conditioning compressor unit 21a. An axial hole for the shaft 210 and a swash plate chamber 218 housing the swash plate 211 are formed at the central part of the cylinder block 215. The swash plate chamber 218 communicates with the cylinder bores 216. On the other hand, an oil chamber 219 normally filled up with lubricant is also formed at the lower part in the cylinder block 215.

The end surfaces of the cylinder block 215 carry end plates 222 and 223 through an intake valve 221 formed of an elastic metal plate and an annular valve plate. These parts 215, 220, 221, 222 and 223 are securely fastened and fixed to each other by a through bolt 224. The right and left valve plates 220, 220 are formed with five intake ports 225 repspectively, each of which is communicable with the ten cylinders 217, 217a through the intake valve 221.

The end plates 222 and 223 have a similar construction, except that the end plate 222 has a refrigeration-freezing intake port 21f makig up a sub-intake port, while the other end plate 223 is formed with a central hole 226 through which the shaft 210 is passable rotatably. The end plates 222, 223 are panshaped and have on the internal sides thereof substantially oval partition walls 227, 228 projected in axial direction respectively. The interior of the partition walls 227, 228 makes up an outlet chamber 229. An intake chamber 231 is formed beetween the partition walls 227, 228 and the outer peripheral walls of the end plates 222, 223. The end plate 222 has a partition wall 233 different from the partition wall 227 which separates the sub-intake chamber 234 from the intake chamber 231 (See FIG. 3), unlike in the end plate 223. The refrigeration-freezing intake port 21f is open into the sub-intake chamber 234. This sub-intake chamber 234 communicates with the cylinder 217a through the intake port 225 corresponding to the cylinder 217a, while the intake chamber 231 communicates with all the remaining cylinders 217. The right and left valve plates 220, 220 have five outlet ports 235 corresponding to the five cylinders respectively. These outlet ports 235 are operated by an outlet valve not shown, in such a manner that when this valve is open, the communication with the outlet chamber 229 is established. The outlet chamber 229 communicates with the outlet port 21c in FIG. 1 through the path 236 in FIG. 3.

As apparent from the foregoing description, a single cylinder 217a communicable with the sub-intake chamber 234 makes up a freezing-refrigeration sub-compressor unit 21b, and the other nine cylinders 217 a main compressor unit 21a for air conditioning. The air-conditioning inlet port 21e making up the main intake port is formed at the upper part on the outer periphery of the cylinder block 215 as shown in FIG. 2, and communicates with the swash plate chamber 218 by way of the structure mentioned later. The swash plate chamber 218 communicates with the right intake chamber 231 through a path formed by the gap beetween the through bolt 224 and the bolt hole 224a. As a result, the refrigerant flowing into the intake chamber 231 from the swash plate chamber 218 is thus taken into all the cylinders 217 except for the cylinder 217a. The refrigerant that has flowed into the intake chamber 234 from the freezing-refrigeration intake port 21f, on the other hand, is introduced into this cylinder 217a, that is, the sub-compressor unit 21b through the intake port 225 corresponding to the cylinder 217a.

In order for the air-conditioning intake port 21e to communicate with the swash plate chamber 218, the interior surface of the cylinder bore 216 is formed with a communication groove 237 at the central part axially thereof, which groove extends radially over a part of the periphery of the piston 212 in the cylinder bore 216. This communication groove 237 opens direct into the swash plate chamber 218 on the one hand, and communicates with the air-conditioning intake port 21e through a communication hole not shown on the other hand.

Figure 2:
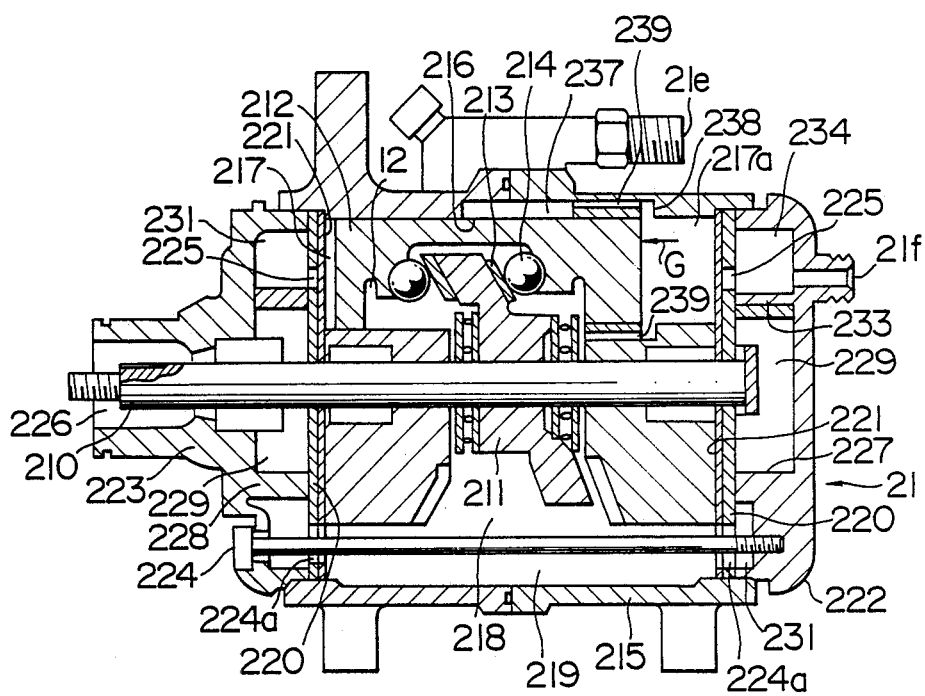
FIG. 2 is a longitudinal sectional view of a compressor 21 shown in FIG. 1.
Figure 3:
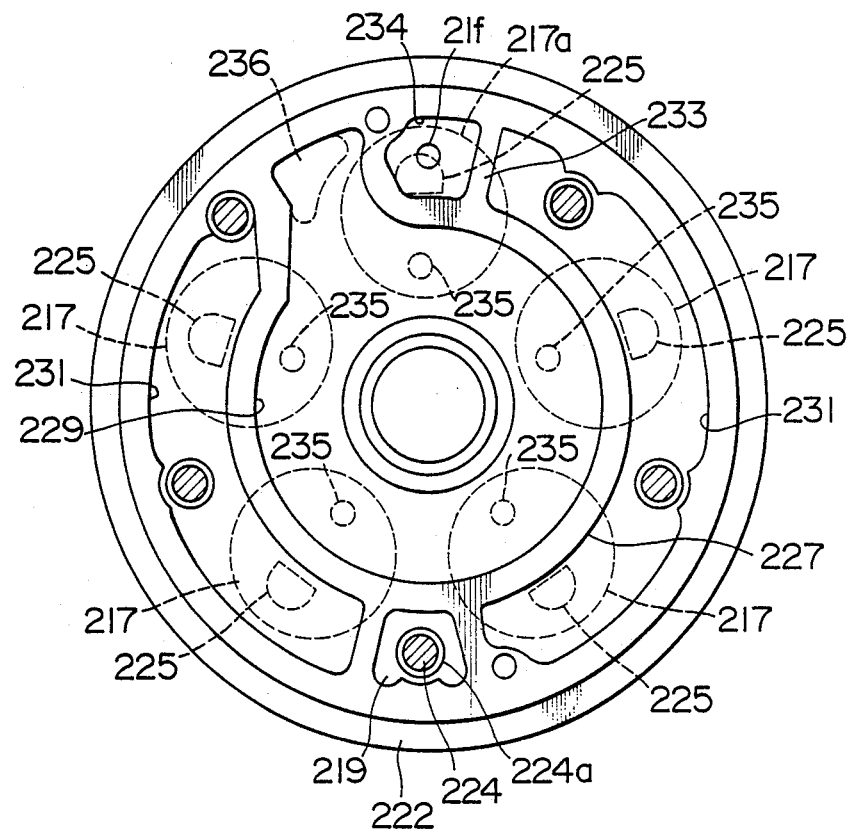
FIG. 3 is a partly cut-away side view of the compressor 21 shown in FIG. 2.

The discharge port 21c (FIG. 1) of the compressor 21 is disposed at the upper part of the outer side of the cylinder block 215 in juxtaposition with the air-conditionining intake port 21e, although not shown in FIG. 2. This discharge port 21c comminicates with the discharge chambers 229, 229 in the right and left end plates 222, 223 through the passage 236 shown in FIG. 3.

The communication path 21d shown in FIG. 1 has an annular groove 238 formed radially along the whole inner peripheral surface of the cylinder 217a making up the sub-compressor unit 21b at a position near the bottom dead center of the piston 212. This groove 238 communicates all the time with the swash plate chamber 218 and the communication groove 237 through a plurality of axial communication holes 239 formed in spaced relationship with each other along the circumferential direction in the peripheral wall of the cylinder 217a surrounding the piston 212. As a result, the piston 212 in the cylinder 217a moves in the direction of arrow G in FIG. 2 thereby to introduce the low-pressure refrigerant from the freezing-refrigeration intake port 21f through the sub-intake chamber 234 and the intake port 225, so that when the piston 212 subsequently reaches the bottom dead center to open the circumferential annular groove 238 to the cylinder 217a, the low-pressure refrigerant for air-conditioning flows from the groove 237 and the swash plate chamber 218 through the communication hole 239 making up the communication path 21d and the annular groove 238 into the cylinder 217a and mixes with the freezing-refrigeration low-pressure refrigerant in the cylinder. Let the pressure of the freezing-refrigeration low-pressure refrigerant be 0.5 kg/cm$^2$ and the pressure of the air-conditioning low-pressure refrigerant be 2.0 kg/cm$^2$. When the air-conditioning low-pressure refrigerant flows into the cylinder 217a through the communication path 21d and mixes with the freezing-refrigeration low-pressure refrigerant, the pressure of the refrigerant in the cylinder 217a becomes substantially equal to the pressure at the time of starting compression of another cylinder making up the main compressor unit 21a that is, 2.0 kg/cm$^2$. Therefore, the compression stroke in the cylinder 21a begins with almost the same compression-start pressure as other cylinder 217, and the compressed refrigerant is discharged into a common discharge chamber 229 and merges with the refrigerant discharged from other cylinders 217, followed by being discharged toward the condenser 22 from the outlet port 21c shown in FIG. 1 through the path 236.

The refrigerant may thus be compressed from the same pressure at the freezing-refrigeration compressor unit 21b as at the air-conditioning compressor unit 21a, so that the compressor 21 saves power as compared with the case in which compression is started from different intake pressures.

The compressor 21 may be of vane type instead of the multi-cylinder compressor of swash plate type mentioned above. In the latter case, if the freezing-refrigeration intake port 21f and the air-conditioning intake port 21e are opened in the ascending order of intake pressure along the rotational direction of the rotor, it is possible for the respective compressor units 21b and 21a to start compression at the highest intake pressure 2.0 kg/cm$^2$. As mentioned above, the compressor units 21a, 21b of the compressor 21 according to this embodiment have independent intake ports 21e, 21f, thereby making it possible to set the intake pressure of each compressor unit independently of each other.

The discharge port 21c of the compressor 21 is connected with the condenser 22 as shown in FIG. 1, and the outlet side of the condenser 22 to the receiver 23. An air-conditioning pressure reducer comprising, in this example, a temperature-actuated expansion valve 24 and an air-conditioning evaporator 25 connected therewith is mounted on the discharge side of the receiver 23. A blow fan 50 for air-conditioning air is arranged on the upstream of air of the evaporator 25. The refrigerant outlet of the evaporator 25 is connected to the air-conditioning intake port 21e of the compressor 21 by the air-conditioning intake pipe 45.

A constant-pressure expansion valve 27 making up a specific example of the freezing-refrigeration pressure reducer, the freezing evaporator 28 and the refrigeration evaporator 32 connected with the constant-pressure expansion valve 27 are arranged in parallel to the air-conditioning expansion valve 24 and the evaporator 25. The freezing evaporator 28 and the freezing cold-storage member 29 cooled thereby are arranged in the freezing chamber 74 described later. The refrigeration evaporator 32 and the refrigeration cold-storage member 31 cooled thereby, on the other hand, are disposed in the refrigeration chamber 75 mentioned later. A check valve 33 for passing the refrigerant gas only in one way to the intake side of the compressor is connected to the outlet of the refrigeration evaporator 32. The discharge side of this check valve 33 is connected to the freezing-refrigeration intake port 21f of the compressor 21 by the freezing-refrigeration intake pipe 46. The constant-pressure expansion valve 27 is adapted to open when the pressure downstream thereof, that is, the pressure of the freezing evaporator 28 drops below a set pressure such as to 0.5 kg/cm$^2$ or lower.

A communication pipe 47 provides a communication between the air-conditioning intake pipe 45 and the freezing-refrigeration intake pipe 46, and has a solenoid valve 48, the opening of which establishes communication between the intake pipes 45 and 46.

Now, the electrical circuit of this embodiment will be explained. In FIG. 1, numeral 1 designates a vehicle battery connected through an air-conditioning switch 2 to an air-conditioning control circuit 3. Numeral 4 designates a refrigerator switch which is connected through the air-conditioning switch 2 to the battery 1. The refrigerator 4 is connected to a refrigerator control circuit 5. Numeral 6 designates a temperature sensor provided on the air outlet side of the air-conditioning evaporator 25, which temperature sensor 6 includes a thermistor connected to the air-conditioning control circuit 3. When the blow-off temperature of the evaporator drops below a set temperature, the resistance of the temperature sensor 6 increases to prevent the air-conditioning evaporator 25 from freezing. The air-conditioning control circuit 3 detects this change in resistance value, and turns off current to the magnetic clutch 20 thereby to deactivate the compressor 21.

Numeral 7 designates a temperature sensor including a thermistor for detecting the surface temperature of the cold storage member 31 cooled by the refrigeration evaporator 32. This temperature sensor 7 is connected to the refrigerator control circuit 5. When the detection temperature of the temperature sensor 7 lowers below a second set temperature, the refrigerator control circuit 5 cuts off the current to the solenoid valve 48 to open the same. When the detection temperature of the temperature sensor 7 drops to the first set temperature slightly higher than the second set temperature, on the other hand, the control circuit 5 turns on an indicator 8 such as a lamp or an LED.

This indicator 8 is disposed on the outer surface or like of the refrigerator case described later.

Figure 4:
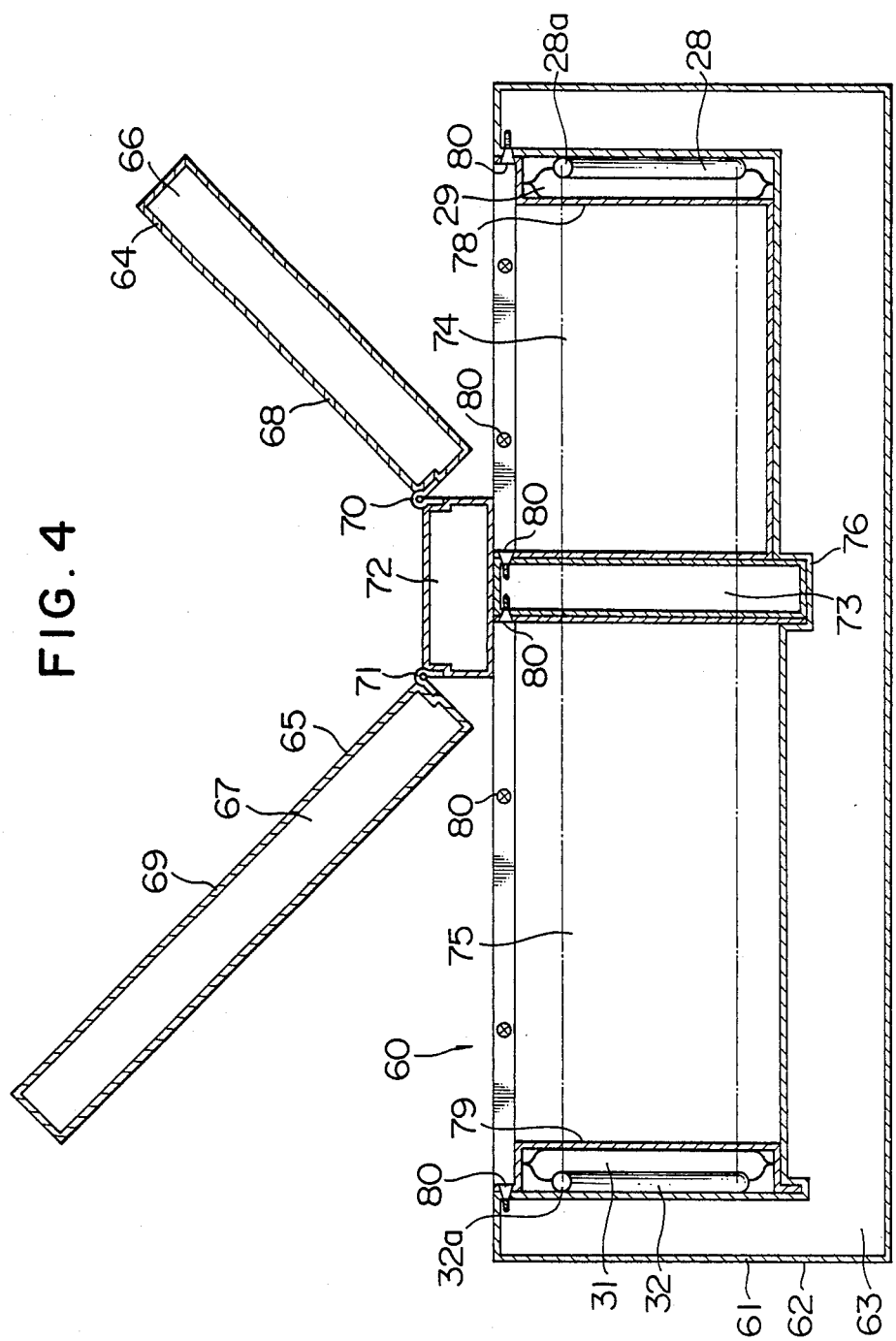
FIG. 4 is a longitudinal sectional view with the door of the freezer-refrigerator open.
Figure 5:
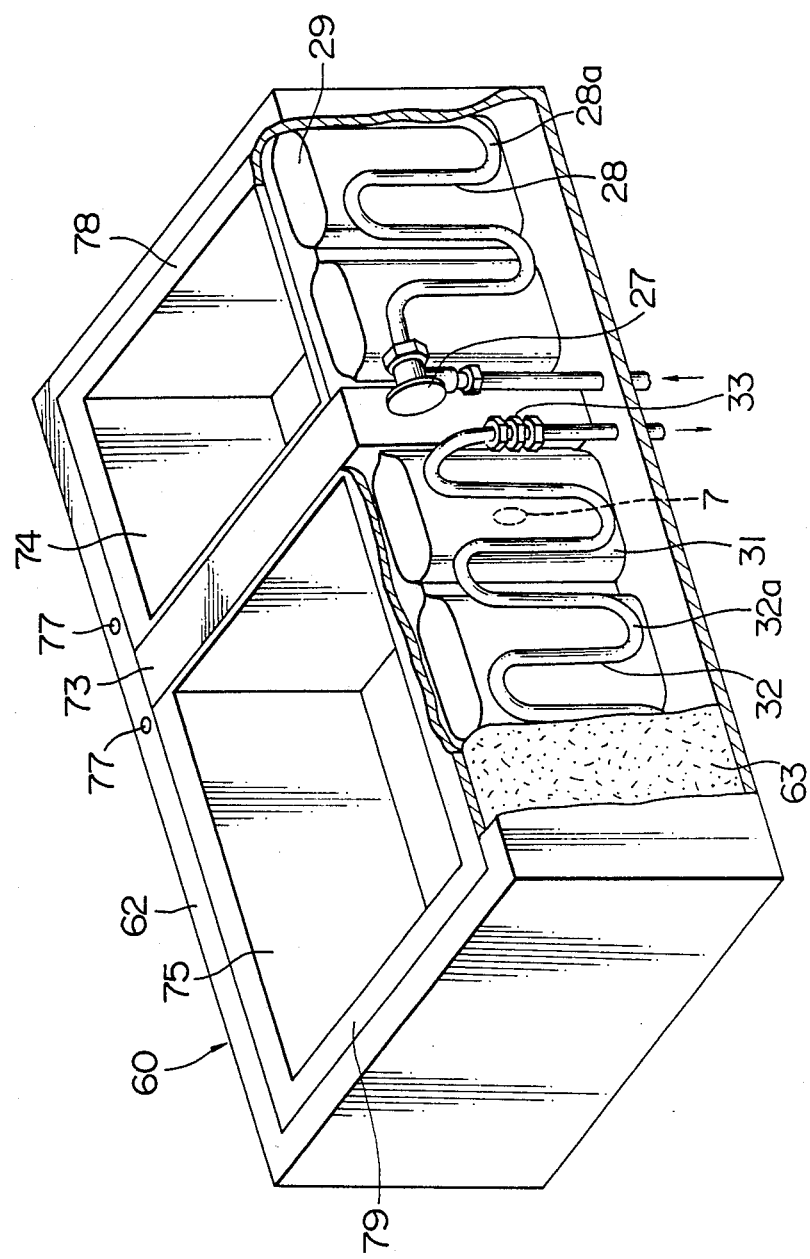
FIG. 5 is a partly cut-away perspective view with the door removed in FIG. 4.

Now, explanation will be made of a specific construction of the automotive freezer-refrigerator having the freezing evaporator 28 and the refrigeration evaporator 32. FIGS. 4 and 5 illustrate a specific construction of an automotive freezer-refrigerator. The freezer-refrigerator 60 according to this embodiment includes a case of double-wall structure made of double resin members 62 of polyethylene or polypropyrene. Further, a heat insulating material 63 such as hard polyurethane is injected in the double wall structure in order to improve heat insulation. In the freezer-refrigerator 60, the freezer door 68 and the refrigerator door 69 having resin materials 64, 65 of double structure combined with heat insulating materials 66, 67 such as hard polyurethane like the case 61 are freely coupled to the central cover 72 of the freezer-refrigerator 60 by hinges 70, 71. A rubber member (not shown) containing a magnet therein is fixed on the upper-end peripheral portion of the case 62, which rubber member is adsorbed securely by magnetic force to an iron plate not shown fixed on the periphery of the doors 68, 69.

The interior of the case 62 is partitioned into a freezing chamber 74 and a refrigeration chamber 75 by a flat partition member 73 having a heat insulating structure like the case 62. The lower end of the partition member 74 is inserted into a channel groove 76 of the case 62, while the upper end thereof is held by being pressed by a central cover 72. The central cover 72 is secured to the case 62 with the upper end of the partition member 73 pressed by a screw not shown attached to a mounting hole 77 (FIG. 5) placed at the upper surface of the case 62.

Figure 6:
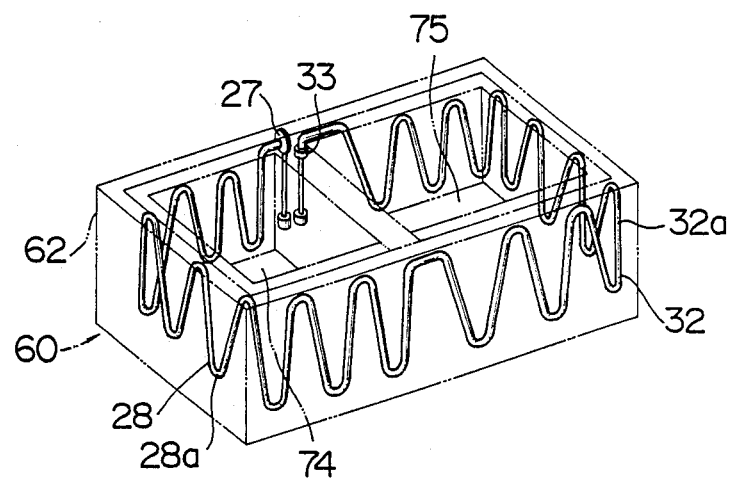
FIG. 6 is a schematic perspective view showing the manner in which piping is laid for the evaporator in the freezer-refrigerator.

As shown in FIG. 5, the constant-pressure expansion valve 27 and the check valve 33 are arranged in the case 62. The freezing evaporator 28 connected to the downstream side of the constant-pressure expansion valve 27 is comprised of a zig-zag pipe 28a of a pipe round in section as shown. This pipe 28a is arranged along the interior surface of the case 62 in such a manner as to surround the freezing chamber 74. The refrigeration evaporator 32 also is comprisied of a similar pipe 32a, which is arranged along the interior surface of the case 62 in a manner to surround the refrigeration chamber 75. In this way, the four interior surfaces of the case 62 carry the pipe 28a or 32a as shown schematically in FIG. 6. The pipes 28a, 32a are made of copper or aluminum.

The freezing cold-storage member 29 is arranged in close contact on the interior of the zig-zag pipe 28a of the freezing evaporator 28. In this embodiment, the cold-storage member 29 comprises a multiplicity of (say, five) easily-deformable cold-storage bags of aluminum foil or like juxtaposed and hermetically containing therein a cold-storage material. The cold-storage material in the freezing cold storage member 29 is provided, for example, by an eutectic solution of 19.7% potassium chloride having an eutectic point (freezing temperature) of $-11°$ C. The interior of the pipe 32a of the refrigeration evaporator 32 carries the refrigeration cold-storage member 31 closely thereon. This cold-storage member 31, like the cold-storage member 29, includes a multiplicity of cold-storage bags, but containing water as the cold-storage material with the freezing point of $0°$ C.

After the evaporators 28, 32 and the cold-storage members 29, 31 are arranged as mentioned above, cooling plates 78, 79 made of metal high in heat conductivity such as aluminum or stainless steel are arranged in close contact with the cold-storage members 29, 31 on the interior further inside of the cold storage members 29, 31. The cooling plate for freezing, as shown in FIG. 4, is formed in box shape with the upper side alone thereof openable. This cooling plate is fastened securely to the partition member 73 and the case 62 by a screw 80 at a portion near the upper end thereof. The refrigeration cooling plate 79, on the other hand, is formed with the upper and lower sides thereof openable and in square, being fastened securely to the case 62 and the partition member 73 by a screw 80 at a portion near the upper end thereof.

The temperature sensor 7 for detecting the temperature of the refrigeration cold-storage member 31 is closely fixed between the cooling plate 79 and the cold-storage member 31 positioned at the most downstream side of the pipe 32a of the refrigeration evaporator 32 as shown in FIG. 5.

Figure 7:
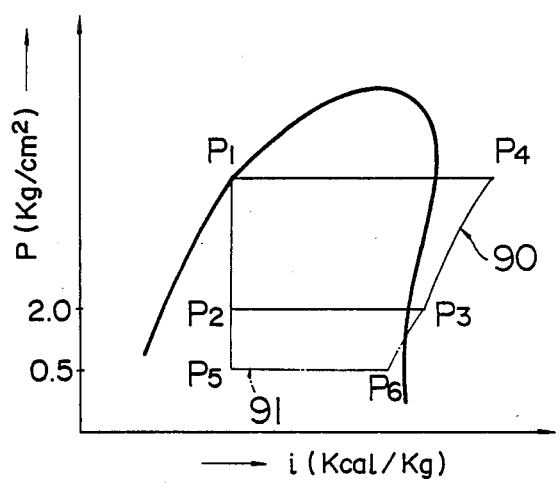
FIG. 7 is a Mollier chart of the freezing cycle.

Now, the operation of this embodiment will be explained. A Mollier chart of the freezing cycle is shown in FIG. 7. In FIG. 7, the cycle of solid line 90 represents the operation characteristic of the freezing cycle for air-conditioning, and the one-dot chain 91 the operation characteristic of the freezing cycle for freezing-refrigeration. When the air-conditioning switch 2 is turned on, the air-conditioning control circuit 3 is energized. In the beginning of air-conditioning mode, the blow-off air temperature of the air-conditioning evaporator 25 is higher than a set temperature (such as $3°$ C.), and therefore the control circuit 3 compares the detection signal of the temperature sensor 6 with a reference signal to produce a "high" output signal, thereby energizing the magnetic clutch 20. The magnetic clutch 20 is thus connected, and the driving power of the automotive engine is transmitted to the compressor 21, so that the compressor 21 is driven to compress the refrigerant gas.

In this condition, turning on the operation switch 4 of the freezer-refrigerator 60 energizes the control circuit 5. Since in the beginning the surface temperature of the refrigeration cold-storage member 31 is higher than the first set temperature (say, $-3°$ C.), the control circuit 5 compares the detection signal of the temperature sensor 7 with a reference signal thereby to produce a "high" signal output, which is applied to the solenoid valve 48, and therefore the solenoid valve 48 remains closed. The indicator 8, which is supplied with a "low" output, remains off. Since the solenoid valve 48 is closed, the air-conditioning refrigerant from the air-conditioning intake pipe 45 is introduced into the main intake port 21e of the compressor 21, and the freezing-refrigeration refrigerant from the freezing-refrigeration intake pipe 46 into the sub-intake port 21f, independently of each other.

The freezing-refrigeration compressor unit 21b of the compressor 21 communicates with the air-conditioning compressor unit 21a through the passage 21d at the end of the intake stroke (near the bottom dead center) as mentioned above. The pressure in the freezing-refrigeration compressor unit 21b, therefore, is increased up to 2.0 kg/cm$^2$ (from P$_6$ to P$_3$ in FIG. 7) that is the same pressure level as on the air-conditioning side by the refrigerant flowing in from the air-conditioning compressor unit 21a. As a result, both compressor units 21a, 21b compress the refrigerant of 2.0 kg/cm$^2$ in pressure (P$_3$ to P$_4$ in FIG. 7). The refrigerant gases thus compressed are mixed with each other and discharged by way of the discharge port 21c and cooled by the condenser 22 (P$_4$ to P$_1$ in FIG. 7).

This liquefied refrigerant is stored in the receiver 23, and being reduced in pressure (P$_1$ to P$_5$ and P$_1$ to P$_2$) by the operation of the constant-pressure expansion valve 27 and the temperature-operated expansion valve 24, is evaporated (P$_5$ to P$_6$ and P$_2$ to P$_3$) in the evaporators 28, 32 and 25. Point P$_1$ represents the state of the high-pressure refrigerant at the inlet of the temperature-operated expansion valve 24, point P$_2$ the state of the refrigerant at the outlet of the expansion valve 24, point P$_3$ state of the refrigerant at the intake port 21e of the air-conditioning compressor unit 21a, and point P$_4$ the state of the refrigerant at the discharge port 21c. By setting the opening pressure of the constant-pressure expansion valve 27 in the freezing-refrigeration cycle appropriately, the refrigerant at the downstream of the constant-pressure expansion valve 27 is set to P$_5$. Specifically, it is possible to maintain the evaporation pressure of the evaporators 28, 32 at 0.5 kg/cm$^2$ by the operation of the constant-pressure expansion valve 27. As described above, by maintaining the evaporation pressure at 0.5 kg/cm² in the freezing-refrigeration evaporators 28, 32, the refrigerant temperature can be held at −21° C. to perform the refrigeration and freezing functions.

The refrigeration and freezing operations will be described more in detail. In the freezing cycle shown in FIG. 1, the refrigeration evaporator 32 is serially connected at the downstream of the freezing evaporator. Therefore, the low-temperature refrigerant which has been reduced in pressure to 0.5 kg/cm² (evaporation temperature at −21° C.) by the constant-pressure expansion valve 27 is evaporated in the region of the freezing evaporator 28 to cool the freezing cold-storage in the initial period. As a result, the refrigerant gas that has evaporated flows into the refrigeration evaporator 32, so that the refrigeration cold-storage member 31 is cooled only to a small degree.

With the lapse of time, the cooling of the freezing cold-storage member 29 progresses, and when the temperature thereof lowers to the eutectic point of the cold-storage member (say, −11° C.), the freezing cold-storage member 29 begins to freeze. In the process, the cold-storage member 29 located at the refrigerant inlet of the pipe 28a of the freezing evaporator 28 is first frozen, and upon completion of freezing of the cold-storage member at the refrigerant outlet, the difference between the refrigerant evaporation temperature and the temperature of the cold-storage member 29 is reduced to a very small amount, and therefore the amount of heat absorbed by the refrigerant is extremely reduced at the freezing evaporator 28. As a result, the refrigerant does not substantially evaporate at the freezing evaporator 28, but is applied to the refrigeration evaporator 32 in the form of gas-liquid double state for cooling the refrigeration cold-storage member 31. This reduces the temperature of the refrigeration cold-storage member 31 to less than 0° C., starting the freezing of the cold-storage material (water) in the cold-storage member 31. In this case also, the cold-storage member 31 located at the refrigerant inlet of the pipe 32a of the refrigeration evaporator 32 is first frozen, and the cold-storage member 31 at the refrigerant outlet finally. When the surface temperature of the cold-storage member 31 lowers to a first set temperature, say, −3° C., upon completion of the freezing of the cold-storage member at the refrigerant outlet, the control circuit 5 identifies the detection signal of the temperature sensor 7 and applies a "high" output signal to the indicator 8, with the result that the indicator 8 is lit thereby to indicate the complete freezing (cold storage) of the cold-storage members 29, 31. And when the surface temperature of the refrigeration cold-storage member 31 at the refrigerant outlet lowers to a second set temperature, say, −5° C., lower than the first set temperature, the control circuit 5 identifies the detection signal of the temperature sensor 7, and applies a "low" output signal to the solenoid valve 48 thereby to open the same. Then, the communication pipe 47 opens, and through it, the refrigerant on the air-conditioning side flows into the freezing-refrigeration intake port 21 of the compressor 21. As a consequence, the pressure in the freezing-refrigeration intake pipe 46 rises up to the refrigerant pressure on air-conditioning side (2.0 kg/cm²), so that the constant-pressure expansion valve 27 remains closed. All the cylinders of the compressor 21 are thus used for air conditioning. Since the reverse flow of the refrigerant on the air-conditioning side to the freezing-refrigeration evaporators 28, 32 is stopped by the check valve 33, the evaporators 28, 32 are kept at low temperature for some time internally.

The reason why the temperature (first set temperature) for lighting the indicator 8 is lower than the temperature (second set temperature) for opening the solenoid valve 48 is to prevent the indicator 8 from being turned off as a result of an increase in the surface temperature of the cold-storage member 31 in a short period of time by the opening of the solenoid valve 48.

As mentioned above, upon complete freezing of the refrigeration cold-storage member 31 and the freezing cold-storage member 29, the interior of the freezing chamber 74 and the refrigeration chamber 75 can be maintained at low temperature near the freezing temperature of the cold-storage member for a long time (for instance, three hours with 700 g amount of freezing cold-storage material) even when the compressor 21 stops as the automotive engine stops for parking or other purposes.

Figure 8:
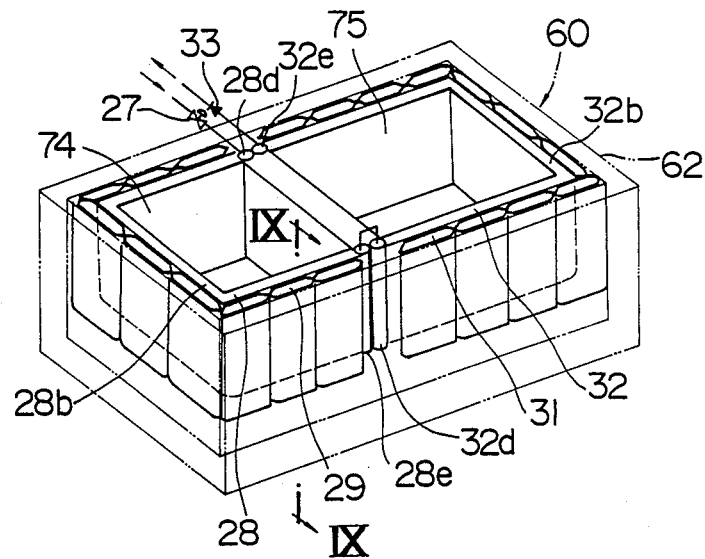
FIG. 8 is a schematic perspective view of another embodiment of the present invention.
Figure 9:
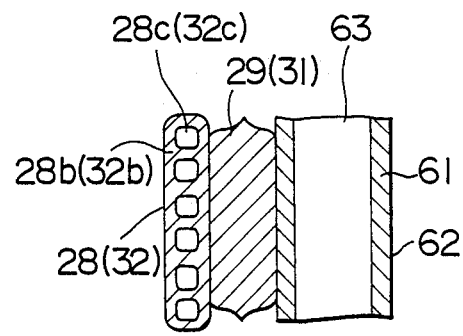
FIG. 9 is a sectional view taken in line IX—IX in FIG. 8.

FIGS. 8 and 9 show another embodiment of the present invention. Flat porous tubes 28b, 32b are used for piping of the evaporators 28, 32. With the refrigerant passage holes 28c, 32c of the tubes 28b, 32b directed horizontally, the evaporators 28, 32 are arranged in close contact with the interior of the cold-storage members 29, 31. According to this embodiment in which the tubes 28b, 32b are flat, the tubes 28b, 32b themselves function as the cooling plates 78, 79 shown in FIG. 4 at the same time, thus saving the latter.

Figure 10:
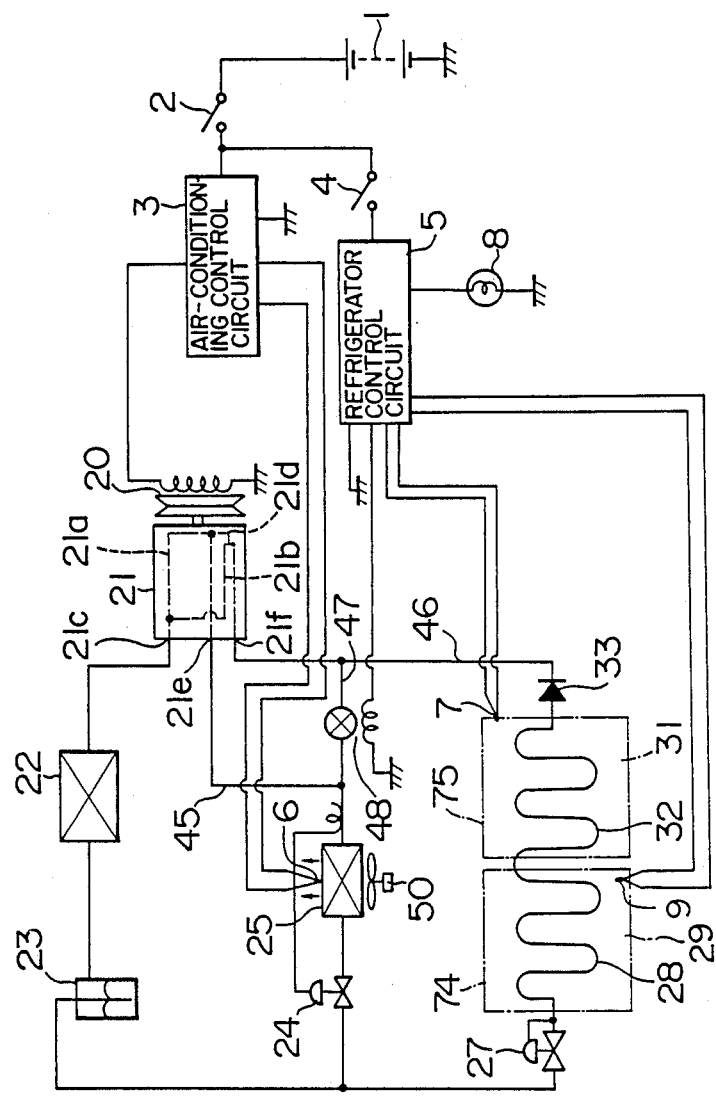
FIG. 10 is a diagram showing a freezing cycle including a modified electrical circuit according to a further embodiment of the present invention.
Figure 11:
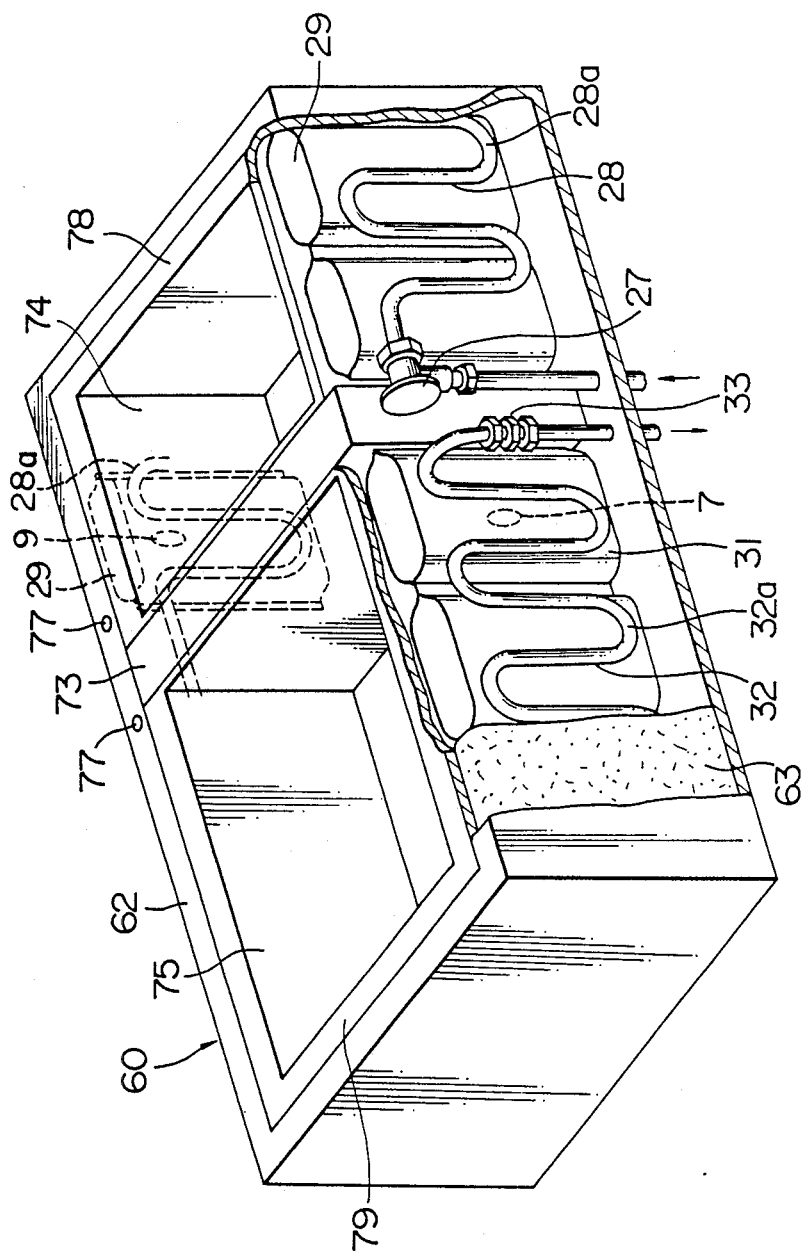
FIG. 11 is a perspective view showing location of two temperature sensors on freezing and refrigeration sides and corresponds to FIG. 5.

Next, FIG. 10 is referred to which shows a further embodiment of the present invention for controlling the freezing cycle by adding to the embodiment of FIG. 1 a temperature sensor 9 for detecting the temperature of the freezing cold-storage member 29 in the freezing chamber 74. FIG. 11 illustrates the location of the temperature sensors 7 and 9. The further embodiment is implemented principally for the purpose of prevention of possible freezing of the refrigeration side when the cooling operation further proceeds, and for the purpose of control of the degree of cold storage for keep-cold mode or under thermal load variations.

Figures 12, 13:
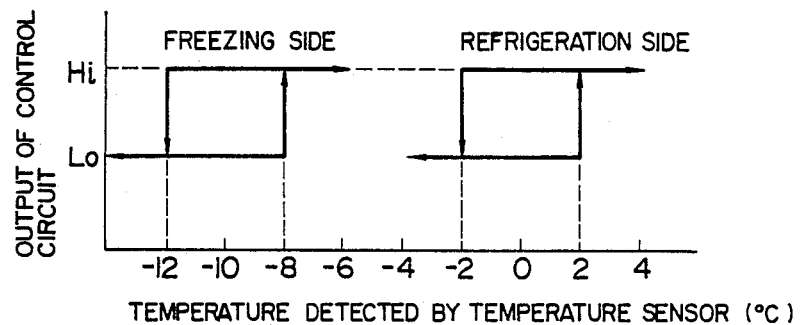
FIG. 12 is a diagram showing "High" and "Low" output characteristics against the detection temperature of the temperature sensors on freezing and refrigeration sides respectively.
FIG. 13 is a diagram showing the relationship between "High" and "Low" outputs of the temperature sensors on the freezing and refrigeraton sides and the mode, and the operation of a solenoid valve and a display unit.

Assume that the signal of the temperature sensor 9 is identified by the control circuit 5, and as shown in FIG. 12, the temperature lowers from the high-temperature side so that a "high" signal is produced at temperatures higher than, say, −12° C. and a "low" signal below −12° C., while the temperature increases from the low-temperature side so that a "low" signal is produced at temperatures lower than, say, −8° C. and a "high" signal at temperatures higher than −8° C.

Also assume that the signal of the temperature sensor 7 for detecting the temperature of the refrigeration cold-storage member 31 identified by the control circuit 5, and as shown in FIG. 12, the temperature lowers from the high-temperature side so that a "high" signal is produced at temperatures higher than, say −2° C., and a "low" signal below −2° C., while the temperature increases from the low-temperature side so that a "low" signal is produced at temperatures lower than, say, 2° C. and a "high" signal at temperatures higher than 2° C.. The central value of the freezing hysteresis, say, −10° C. corresponds to the detection temperature of the temperature sensor 9 during the freezing of the freezing cold-storage member 29, and the central value of the refrigeration hysteresis, say, 0° C., corresponds to the detection temperature of the temperature sensor during the freezing of the refrigeration cold storage member 31. Experiences show the proper value of hysteresis is 4° C.

The above-mentioned two output signals of freezing and refrigeration are compared in the manner shown in FIG. 13 in the control circuit 5 to produce a signal for operating the solenoid valve 48 and on-off of the indicator 8.

Figure 15:
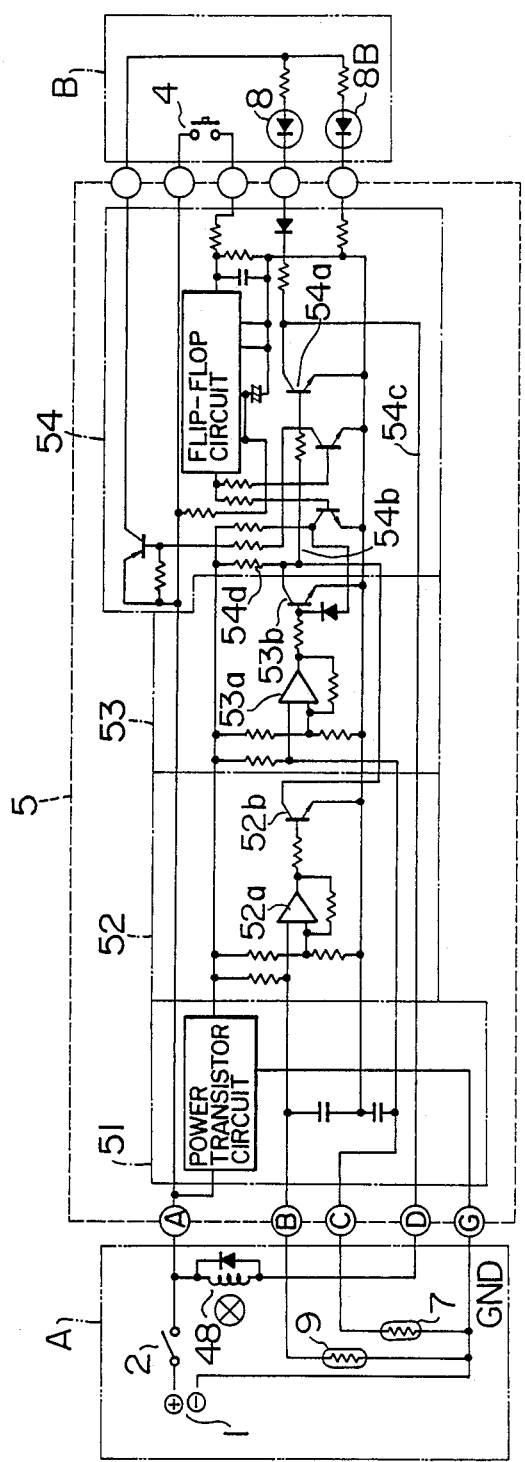
FIG. 15 is a circuit diagram showing a specific example of the control circuit included in FIG. 1.

FIG. 15 shows a specific electrical control circuit 5. Reference character A designates a sensor and a power supply, the component elements of which are shown in FIG. 1. Numeral 51 designates a voltage regulator including a power transistor. Numeral 52 designates a high-low decision means including a comparator supplied with a signal from the freezing chamber temperature sensor 9 to make a decision on "high" or "low". Numeral 53 also designates a similar high-low decision means for deciding a "high" or "low" state of the signal from the refrigerator temperature sensor 7. Numeral 54 designates a mode decision and control output unit including a flip-flop for deciding on the mode as shown in FIG. 13 from combinations of "high" and "low" states on the basis of signals of the temperature sensors 9 and 7 supplied thereto from the decision means 52 and 53. This mode decision causes a signal for controlling the solenoid valve 48 to be produced to turn on or off the indicator 8 at the same time. Character B designates a switch and display section the component elements of which are shown in FIG. 1. 8B designates a light-emitting diode turned on or off in interlocked relationship with the operation of the switch 4.

When the freezing chamber temperature sensor (thermistor) 9 is at "high" level, a comparator 52a delivers an output since a voltage to be compared is below a reference voltage, and a transistor 52b is rendered conductive due to the flow of its base current.

Conversely, when the temperature sensor 9 is at "low" level, the output is not delivered from the comparator 52a since the voltage to be compared is above the reference voltage, and the transistor 52b is cutoff with no base current.

When the refrigerator temperature sensor (thermistor) 7 is at "high" level, a comparator 53a delivers an output since a voltage to be compared is below a reference voltage, and a transistor 53b is rendered conductive due to the flow of its base current.

Conversely, when the refrigerator temperature sensor 7 is at "low" level, the output is not delivered from the comparator 53a since the voltage to be compared is above the reference voltage, and the transistor 53b is cutoff with no base current.

Accordingly, when at least either one of the freezing chamber temperature sensor 9 and refrigerator temperature sensor 7 is at "high" level, that is, when at least either one of the transistors 52b and 53b is conductive, since a line 54b is grounded and no base current flows to a transistor 54a, the transistor 54a is cutoff. As a result, no current flows through a line 54c and the solenoid valve 48 is not energized causing the solenoid valve 48 to be closed.

On the other hand, when both the freezing chamber temperature sensor 9 and refrigerator temperature sensor 7 are at "low" level, that is, when both the transistors 52b and 53b are cutoff, since a base current of a transistor 54a flows through a resistor 54d and the line 54b, the transistor 54a is rendered conductive and a current flows through the line 54c. As result, the solenoid valve 48 is energized and the solenoid valve 48 is opened.

Figure 14:
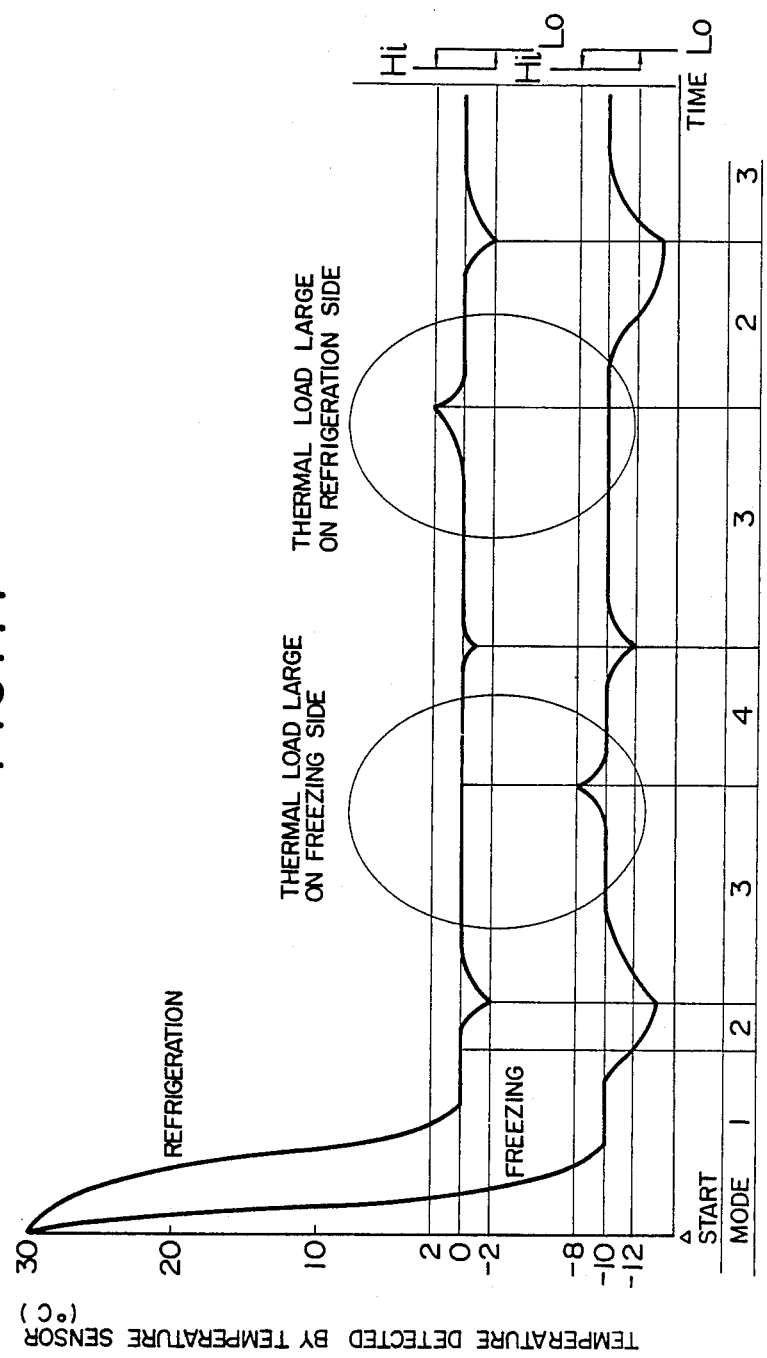
FIG. 14 is a graph showing the relationship between the chronological change in the detection temperature of the temperature sensors on the freezing and refrigeration sides and the mode.

The operation of these functions with chronological temperature change will be explained with reference to FIGS. 13 and 14. Assume that the operation starts from 30° C. both indoor and outdoor. Freezing is followed by refrigeration and cooling. Initially, both the temperature sensors 9, 7 are at "high" level and therefore in mode 1 as shown in FIG. 13. Under this condition, the solenoid valve 48 is closed, and refrigerant is applied to the freezing and refrigeration evaporators, keeping indicator off as cold storage is complete. This is followed by complete cold storage on the freezing side, accompanied by a sudden temperature drop. When the temperature drops to lower than −12° C., for instance, mode 2 is entered, but operation continues and the cold storage state on the refrigeration side is completed, followed by a sudden temperature decrease. When the temperature drops below −2° C. or lower, for instance, both the sensors 9 and 7 produce "low" signals. Further, to prevent the freezing on refrigeration side, the solenoid valve opens and the A/C refrigerant flows in the bypass pipe 47 so that all the cylinders of the compressor 21 allow the air-conditioning refrigerant flowing therein, while at the same time preventing the refrigerant from flowing into the freezing-refrigeration evaporator, in mode 3, thereby entering the cold insulation state, turning on the indicator 8 indicating the completion of cold storage. In the meantime, the air-conditioning ability on the air-conditioning side is supported.

In mode 3 in which cold insulation is maintained, the thermal load on the freezing side becomes maximum, and when the temperature on freezing side turns to "high" level, mode 4 is started. The solenoid valve is thus closed again as shown in FIG. 13, and the refrigerant flows in thereby to cool the freezing side to "low" level. Also when the thermal load on the refrigeration side increases, mode 2 is entered in the same manner thereby to restart the cooling.

Even though the thermal load is unbalanced against the freezing and refrigeration during cold insulation or cold storage, the refrigerant flows from the freezing to the refrigeration side, and therefore the refrigeration side is never frozen with insufficient cold storage on the freezing side. Specifically, when the temperature is high only on the freezing side, the refrigerant evaporates actively especially on the upstream freezing side, while the refrigeration side downstream never freezes with an increased refrigerant temperature.

The present invention is not limited to the above-mentioned embodiments, but may take various modifications as described below.

(1) In the case where a multi-cylinder compressor 21 of swash plate type is used, the freezing-refrigeration compressor unit 21b may have not one cylinder but an increased number of cylinders meeting the capacity required of the refrigerator.

(2) The temperature sensor 7 for detecting the temperature of the freezer-refrigerator 60 may detect the internal temperature of the refrigeration chamber in addition to the surface temperature of the refrigeration cold-storage member 31, or the thermistor may be replaced by a temperature switch using a reed switch or like.

(3) The pressure reducer on the freezing-refrigeration side may take, in place of the constant-pressure expansion valve 27, the form of an ordinary expansion valve of temperature activated type or a combination of a solenoid valve and a fixed reduction.

(4) Instead of the serial connection of the refrigeration evaporator at the downstream of the freezing evaporator 28, the freezing evaporator 28 and the refrigeration evaporator 32 may be connected in parallel with the evaporation pressure set higher for the evaporator 32 than for the evaporator 28.

(5) The freezing chamber 74 and the refrigeration chamber 75 may not be integrally constructed, but may be separately provided if necessary.

(6) In place of the thermistor making up a temperature sensor for detecting the degree of cold storage, a temperature sensor with a reed switch or like may be used.

(7) The temperature of the interior of the freezing or refrigeration chamber, as the case may be, instead of the temperature between the cold-storage member and the cooling plate, may be used as a detection point of the temperature sensor.

(8) Two instead of one indicator (lamp) is acceptable for indication of complete cold storage for freezing and refrigeration.

It will be understood from the foregoing description that according to the present invention, two types of cold storage members of different freezing temperatures corresponding to the freezing and refrigeration functions respectively, the cold-storage member of lower freezing temperature being disposed in the freezing chamber, the cold-storage member of higher freezing temperature located in the refrigeration chamber, both cold-storage members being frozen by respective evaporators, thereby making it possible to maintain the interior of the freezing chamber and the refrigeration chamber at a low temperature near the freezing temperature of the cold-storage members.

Since the cold-storage members are cooled by means of the evaporators closely attached on the outer surfaces thereof, the cold storage material is sealed more easily than in the conventional construction with an evaporator mounted in a cold storage member. In addition, the assembly work of the whole freezer-refrigerator is facilitated with a lower production cost.

According to the present invention, the serial flow of the refrigerant through the freezing evaporator and the refrigeration evaporator is controlled by a single valve device, resulting in a simple structure. Further, the control circuit controls the operation of the valve device by detecting the degree of freezing of the freezing cold-storage member and the refrigeration cold-storage member on the basis of a signal from the temperature sensors for detecting the temperatures in the freezing chamber and the refrigeration chamber, thereby preventing an undesirable situation in which one of the freezing chamber or the refrigeration chamber functions, while the other fails to do so sufficiently. Thus, both the freezing chamber and the refrigeration chamber always perform at full capacity.

We claim:

1. An automotive freezer-refrigerator system comprising:
   a compressor driven by an automotive engine for compressing refrigerant;
   a freezing chamber having therein a freezing cold storage member having freezing cold-storage material therein and a freezing evaporator in said chamber arranged outside and closely to said freezing cold-storage member;
   a refrigeration chamber including a refrigeration cold storage member having therein refrigeration cold-storage material higher in freezing temperature than said freezing cold storage member and a refrigeration evaporator in said refrigeration chamber arranged outside and in close contact with the refrigeration cold storage member;
   valve means for controlling the flow of the refrigerant passing serially through the freezing evaporator and the refrigeration evaporator from said compressor so that the respective freezing and refrigeration evaporators are charged with refrigerant at a substantially uniform pressure;
   a temperature sensor for detecting a temperature of said refrigeration chamber; and
   a control circuit for electrically controlling the operation of said valve means on the basis of a signal from said temperature sensor indicative of the temperature of said refrigeration chamber.

2. An automotive freezer-refrigeration system comprising:
   a compressor driven by an automotive engine for compressing refrigerant;
   a freezing chamber including a freezing cold storage member and a freezing evaporator arranged closely thereto;
   a refrigeration chamber including a refrigeration cold storage member higher in freezing temperature than said freezing cold storage member and a refrigeration evaporator arranged in close contact with the refrigeration cold storage member;
   valve means for controlling the flow of the refrigerant passing serially through the freezing evaporator and the refrigeration evaporator from said compressor so that the respective freezing and said refrigeration evaporators are charged with refrigerant at a substantially uniform pressure;
   a first temperature sensor for detecting a temperature of said refrigeration chamber;
   a second temperature sensor for detecting a temperature of said freezing chamber; and
   a control circuit for electrically controlling the operation of said valve means on the basis of signals respectively indicative of the temperatures of said refrigeration chamber and said freezing chamber.

3. An automotive freezer-refrigerator according to claim 2, wherein said control circuit activates said valve means thereby to pass the refrigerant through said both evaporators when the signal of at least one of the temperature sensors indicates a temperature higher than a predetermined level.

4. An automotive freezer-refrigerator system comprising:
   a compressor driven by an automotive engine for compressing refrigerant, said compressor including an air-conditioning compressor section and a refrigeration-freezing compressor section communicated with each other by a communication path;
   a condenser connected to a discharge port of said compressor for condensing the compressed refrigerant;
   decompression means connected to said condenser through a first pipe for reducing the pressure of said refrigerant;
   a freezing chamber including a freezing cold-storage member and a freezing evaporator and connected to said decompression means;
   a refrigeration chamber including a refrigeration cold-storage member having a higher freezing temperature than said freezing cold-storage member and including a refrigeration evaporator, said refrigeration evaporator being connected to said freezing evaporator downstream thereof;

a refrigeration-freezing intake pipe connected between the outlet of said refrigeration evaporator and a refrigeration-freezing intake port of said compressor;

an air-conditioning apparatus including an expansion valve and an air-conditioning evaporator branched from said first pipe and connected to an air-conditioning intake port of said compressor through an air-conditioning intake pipe;

a communication pipe connected between said air-conditioning intake pipe and said refrigeration-freezing intake pipe;

a solenoid valve provided in said communication pipe for controlling flow of the refrigerant therethrough to both of said respective freezing and refrigeration evaporators;

a temperature sensor provided in said refrigeration chamber for detecting a temperature thereof; and a control circuit electrically connected to said temperature sensor and said solenoid valve for controlling said solenoid valve in accordance with the temperature detected by said temperature sensor such that when the temperature detected by said temperature sensor is below a predetermined set temperature, said solenoid valve is opened to permit the refrigerant to flow through said communication pipe to raise the pressure of the refrigerant in said refrigeration-freezing intake pipe thereby to prevent said decompression means from reducing the pressure of said refrigerant, whereas when the temperature detected by said temperature sensor is above said predetermined set temperature, said solenoid valve is closed to permit the refrigerant to flow through said air-conditioning intake pipe to allow said decompression means to reduce the pressure of the refrigerant in said refrigeration-freezing intake pipe.

5. An automotive freezer-refrigerator system comprising:
a compressor driven by an automotive engine for compressing refrigerant, said compressor including an air-conditioning compressor section and a refrigeration-freezing compressor section communicated with each other by a communication path;
a condenser connected to a discharge port of said compressor for condensing the compressed refrigerant;
a constant-pressure expansion valve connected to said condenser through a first pipe for reducing the pressure of said refrigerant to a predetermined pressure;
a freezing chamber including a freezing cold-storage member and a freezing evaporator and connected to said constant-pressure expansion valve;
a refrigeration chamber including a refrigeration cold-storage member having a higher freezing temperature than said freezing cold-storage member and including a refrigeration evaporator, said refrigeration evaporator being connected to said freezing evaporator downstream thereof;
a refrigeration-freezing intake pipe connected between the outlet of said refrigeration evaporator and a refrigeration-freezing intake port of said compressor;

an air-conditioning apparatus including an expansion valve and an air-conditioning evaporator branched from said first pipe and connected to an air-conditioning intake port of said compressor through an air-conditioning intake pipe;

a communication pipe connected between said air-conditioning intake pipe and said refrigeration-freezing intake pipe;

a solenoid valve provided in said communication pipe for controlling flow of the refrigerant therethrough to both of said respective freezing and refrigeration evaporators;

a temperature sensor provided in said refrigeration chamber for detecting a temperature thereof; and a control circuit electrically connected to said temperature sensor and said solenoid valve for controlling said solenoid valve in accordance with the temperature detected by said temperature sensor such that when the temperature detected by said temperature sensor is below a predetermined set temperature, said solenoid valve is opened to permit the refrigerant to flow through said communication pipe to raise the pressure of the refrigerant in said refrigeration-freezing intake pipe thereby to close said constant-pressure expansion valve, whereas when the temperature detected by said temperature sensor is above said predetermined set temperature, said solenoid valve is closed to permit the refrigerant to flow through said air-conditioning intake pipe to reduce the pressure of the refrigerant in said refrigeration-freezing intake pipe thereby to open said constant-pressure expansion valve.

6. An automotive freezer-refrigerator system according to claim 5 wherein said compressor comprises:
a cylinder block having an axial hole and a swash plate chamber formed at the central part thereof and having a plurality of cylinder bores formed circumferentially with respect to said axial hole;
a swash plate fixed to a shaft, said swash plate being accommodated in said swash plate chamber with said shaft supported in said axial hole rotatably;
a plurality of pistons respectively accommodated in said plurality of cylinder bores and being operatively engaged with said swash plate to transform a rotating movement of said swash plate to a reciprocating movement of each of said plurality of pistons;
a pair of annular valve plates disposed respectively at end surfaces of said cylinder block to close said cylinder bores;
a plurality of cylinders formed by said plurality of cylinder bores at both sides of opposite end surfaces of said pistons; and
a pair of cup-shaped end plates respectively secured to said cylinder block at opposite end surfaces thereof together with said annular plates, each of said cup-shaped end plates having a substantially cylindrical partition wall projecting in the axial direction to form an outlet chamber inside said partition wall and to form an intake chamber between said partition wall and the outer peripheral wall of said end plate, wherein each of said plurality of cylinders is communicated with said outlet chamber and said intake chamber through an outlet port and an intake port formed in said annular valve plate and through an outlet valve and an intake valve; and a further partition wall provided in the intake chamber of one of said cup-shaped end plates to form a sub-intake chamber at a portion corresponding to one of said plurality of cylinders which one cylinder being designated for said freezer-refrigerator compressor section and the rest of the cylinders being designated for air-conditioning compressor section, wherein said air-conditioning intake port is provided at the outer periphery of said cylinder block and connected to said air-conditioning intake pipe, said air-conditioning intake port being communicated with said intake chambers inside said pair of cup-shaped end plates through said swash plate chamber, said refrigeration-freezing intake port is provided on one of said cup-shaped end plates at a position corresponding to said sub-intake chamber and connected to said refrigeration-freezing intake pipe, and said discharge port is provided on the outer side of said cylinder block.

7. An automotive freezer-refrigerator comprising:
a freezing housing defining a freezing chamber therein;
a freely-openable door closing said freezing chamber;
a first cold-storage material contained within an easily-deformable freezing cold-storage member housed in said chamber, said chamber also having therein a freezing evaporator arranged outside and in close contact with said freezing cold storage member;
a refrigeration housing defining a refrigeration chamber therein;
a freely-openable door closing said refrigeration chamber;
a second cold-storage material higher in freezing temperature than said first cold storage material contained within an easily-deformable cold-storage member housed in said refrigeration chamber;
a refrigeration evaporator connected in series and downstream of said freezing evaporator and housed in said refrigeration chamber and arranged outside and in close contact with said refrigeration cold storage member; and
valve means, for directing refrigerant to both of said freezing and refrigeration evaporators, said valve means positioned upstream from said freezing evaporator, so that the respective freezing and refrigeration evaporators are charged with refrigerant at a substantially uniform pressure.

8. An automotive freezer-refrigerator according to claim 7, wherein a multiplicity of said freezing cold storage members and a multiplicity of said refrigeration cold storage members are respectively arranged in juxtaposition.

9. An automotive freezer-refrigerator comprising:
a freezing chamber having a freely-openable door and housing therein a freezing cold-storage member having therein a first cold-storage material and a freezing evaporator in said chamber arranged in close contact with said freezing cold storage member;
a refrigeration chamber having a freely-openable door and housing therein a refrigeration cold storage material higher in freezing temperature than said first cold storage material higher in freezing temperature than said first cold storage material and a refrigeration evaporator in said refrigeration chamber connected in series with said freezing evaporator and arranged in close contact with said refrigeration cold storage member; and
valve means located upstream from said freezing evaporator for regulating the passage of refrigerant so that an evaporating pressure of refrigerant within said freezing evaporator is substantially equal to an evaporating pressure of refrigerant within said refrigeration evaporator.

* * * * *